Oct. 25, 1960 H. E. THOMPSON 2,957,690

DATA STORAGE ACCESS MECHANISM

Filed Feb. 11, 1959 2 Sheets-Sheet 1

INVENTOR.
HERBERT E. THOMPSON

BY Baylor G. Riddell

ATTORNEY

United States Patent Office 2,957,690

Patented Oct. 25, 1960

2,957,690

DATA STORAGE ACCESS MECHANISM

Herbert E. Thompson, San Jose, Calif., assignor to International Business Machines Corporation, New York, N.Y., a corporation of New York Filed Feb. 11, 1959, Ser. No. 792,527

8 Claims. (Cl. 271—3)

This invention relates to data processing machines utilizing a number of groups of closely stored data-bearing elements, such as short lengths of photographic or magnetic tapes, wires or discs, for example, as shown in the copending application of Lin, et al. assigned to the above assignee, Serial No. 792,168, filed Feb. 2, 1959, and entitled Data Storage Apparatus. More particularly, the present invention relates to an access mechanism for producing, with a minimum number of reversals of a driving means connected thereto, the four motions required to pick and process such an element, viz. (1) insertion of a pickup head downwardly below the top of a selected element in its group, (2) withdrawal of the element for processing, (3) replacing of the element within its group, and (4) returning the pickup head to a position clear of the ends of the stored elements to permit the pickup head to be reoriented to a new group.

Ordinary straight-line driving means, such as a reciprocating drive connected directly to a pickup head would normally have to be reversed between each of the above steps. However, using the present invention, only one reversal of the driving means is necessary to impart the four above motions. Thus, the present invention considerably simplifies programming, logic, switching, and control of the driving means employed, thereby making available a greater selection of suitable driving means to be utilized therewith. Further, since each reversal of an ordinary high-speed driving means would usually be accompanied by some shock and noise, the present invention tends to minimize shock, noise, wear and resultant upkeep in such devices.

Therefore, it is an object of the present invention to provide such an access mechanism having a linkage wherein a bidirectional motion applied at one end is smoothly converted to a pair of bidirectional motions at the other.

In data processing machines as described generally above, particularly close control of Steps 1 and 4 is necessary to maintain the high speeds demanded of the mechanical components of such machines without detriment to their proper functioning. For example, the depth to which the pickup head enters a group of tapes must be accurately controlled to prevent damage to the top of the tape itself while simultaneously insuring positive engagement of the pickup head with the tape strip selected. In addition, the pickup must never be allowed to hang below the level of the tape ends while it is being carried to a new group of strips. Due to the nature of the present invention these adjustments are very easily facilitated.

Therefore, it is another object of this invention to provide a strip pickup access drive mechanism wherein the depth to which the pickup head enters a strip storage group is easily controlled.

It is yet another object of this invention to provide a strip pickup access drive mechanism wherein the clearance between the strip tops and the pickup head may be accurately and adjustably established.

In addition to the above, it is still another object of the present invention to provide a strip pickup drive linkage wherein the connecting link functions to provide a properly timed engagement and release of selected strips from their storage locations.

Other objects of the invention will be pointed out in the following description and claims and illustrated in the accompanying drawings which disclose, by way of example, the principle of the invention and the best mode which has been contemplated of applying that principle.

In the drawings:

Figs. 1, 2 and 3 diagrammatically represent the invention during three stages of its operation, i.e., at the ready position prior to picking a strip, at bottom dead center, and during withdrawal of a strip, respectively.

Figures 1, 2:
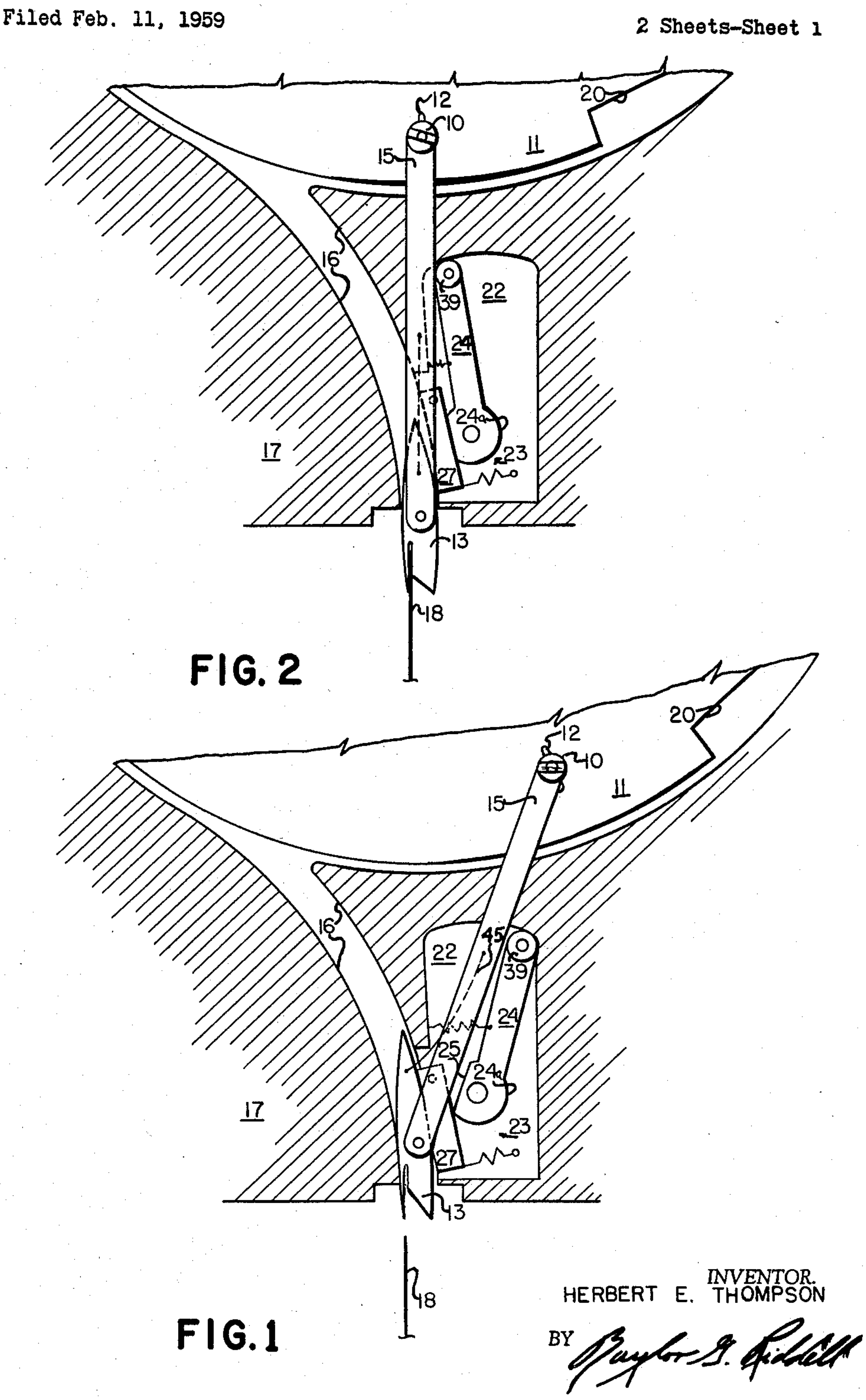
Figure 5:
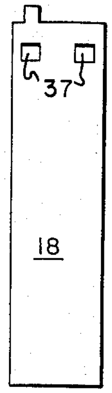
Fig. 5 shows a single film strip of a type which can be employed in the subject invention.
Figure 3:
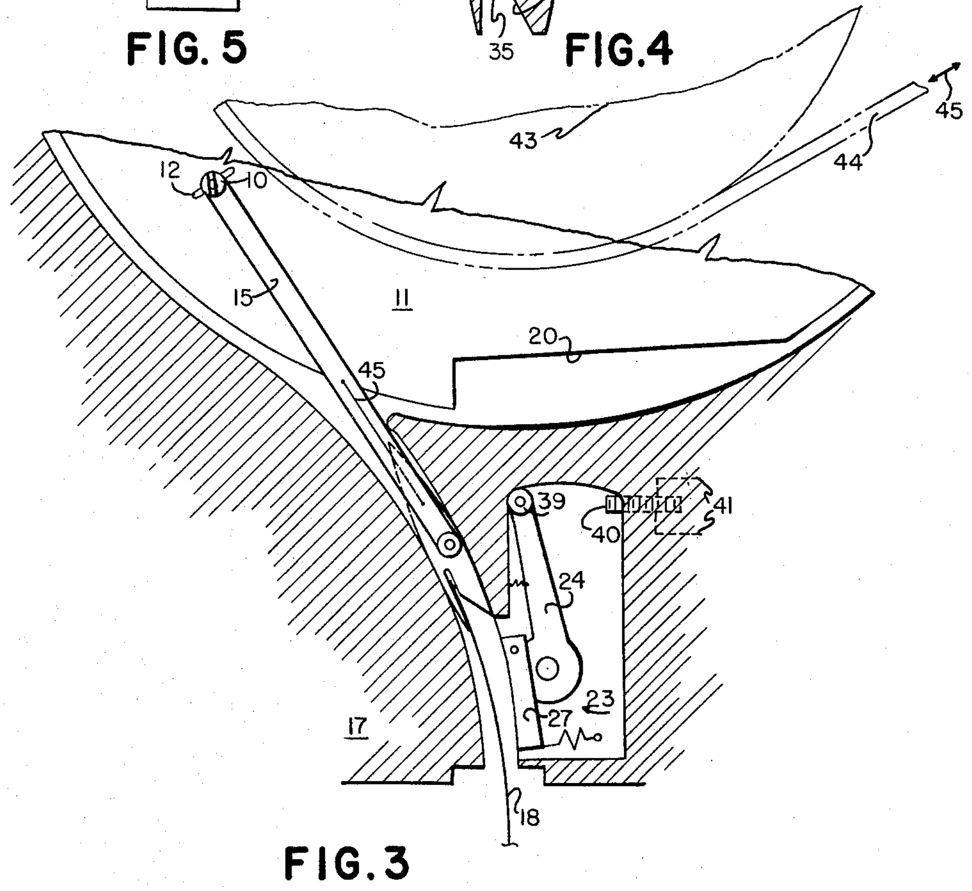

Referring to the drawings and particularly to Figs. 1 through 3, the invention as thereshown comprises a crankpin 10 mounted on a rotatable drum 11. Crankpin 10 is adjustably arranged within a slot 12 for controlling the depth of insertion of a pickup head 13 driven by pin 10 via a connecting rod 15. Head 13 is arranged to travel in a guideway 16 formed in a carriage housing 17, which shall be understood to be positionable with respect to a plurality of data bearing strips, such as strip 18 shown in detail in Fig. 5.

In the arrangement shown, strip 18 is to be withdrawn from storage and placed upon drum 11 for processing by suitable means, either magnetically or photographically depending upon the nature of the application. Therefore, connecting rod 15 is foreshortened sufficiently to withdraw head 13 entirely from guideway 16 under clockwise rotation of drum 11. Drum 11 is further provided with a cavity 20 for recessing the head 13 below the surface of drum 11 so as not to interfere with the processing of a withdrawn strip 18 wrapped therearound. In housing 17 there is further provided a substantially rectangular recess 22 for housing a crankarm assembly 23 which functions to cause head 13 to engage or disengage one of strips 18 as crankpin 10 passes through its bottom dead center position. Assembly 23 is comprised of a crankarm 24 spring-biased to the left and having a hub portion 24_a_. Portion 24_a_ is provided with a substantially flat cam surface 25 for driving a pivoted cam follower 27. Cam follower 27 is spring-biased into surface 25 so as to normally maintain contact therewith up out of the way of guideway 16.

Figure 4:
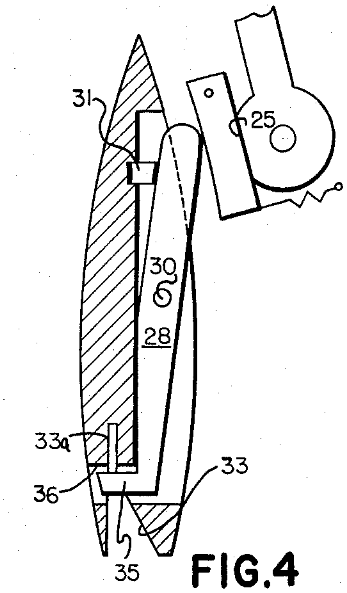
Fig. 4 is a partial sectional view of the pickup head as shown in Figs. 1 through 3.

Referring to Fig. 4 head 13 includes a pair of identical catch levers 28 only one of which has been shown. Levers 28 are mounted to pivot about a pin 30 positioned substantially intermediate their length. The upper end of lever 28 is biased outwardly from head 13 by a leaf spring 31 so as to place the upper end of lever 28 into the path of follower 27. Head 13 is provided at its lower end with an open throat portion 33 which tapers down to a slot 33_a_ for receiving the upper end of tape 18. The lower ends of levers 28 are each provided with a lip 35 which extends through a hole 36 intersecting throat 33, to enable lips 35 to be inserted through a pair of windows 37 in strip 18.

Assembly 23 is actuated by the passage of rod 15 across recess 22 from left to right by engagement of rod 15 with upwardly extending boss 39 fixed to the upper end of arm 24. The extent to which arm 24 can be driven to the right is adjustably controlled by a screw 40 extending into recess 22, and which for purposes of clarity is shown only in Fig. 3. Access to screw 40 is provided by an opening 41 in housing 17. Thus, it can be seen that screw 40 will control the height to which head 13 can be retracted into guideway 16 under counterclockwise rotation of drum 11. Means for driving drum 11 in two directions is schematically shown in phantom lines in Fig. 3 by a pulley 43 which is arranged to turn with drum 11. Pulley 43 is driven by a drive belt 44 connected to a suitable bidirectional driving means such as a reversible motor or a continuous motor acting through a simple reversing clutch, the bidirectional driving means being schematically represented by the arrow 45.

Commencing with the ready position shown in Fig. 1, the operation of the invention will now be described with its particular relation to the four steps initially outlined above. Drive means 45 is driven to impart clockwise rotation to drum 11 via belt 44. Crankpin 10, properly adjusted and fixed in slot 12, moves to the left thereby driving head 13 sufficiently far down over the top of tape 18 to align windows 37 with holes 36 in head 13. This downward motion of head 13 is substantially complete and windows 37 are substantially in register with holes 36 prior to the time crankpin 10 reaches its bottom dead center position. Therefore, since connecting rod 15 will hold boss 39 and hence arm 24 to the right during this registration period, lips 35 of catch levers 28 will not begin to enter windows 37 until registration has been substantially completed. However, as crankpin 10 passes through bottom dead center, rod 15 will release boss 39 to allow counterclockwise rotation of arm 24 and cam surface 25 thereby permitting follower 27 to be raised away from the upper end of levers 28, allowing lips 35 to pass through windows 37.

As crankpin 10 continues clockwise rotation it withdraws head 13, and tape 18 engaged therewith, along guideway 16 and onto drum 11 for processing. After tape 18 has been properly processed, drive means 45 is reversed thereby imparting counterclockwise rotation to drum 11. As drum 11 rotates counterclockwise, strip 18 will pick up guideway 16 and head 13 will enter therein, assisted by centrifugal force and the action of a spring wire 45 connected to its trailing edge and to rod 15 which tends to bias the throat end of head 13 outwardly from drum 11. As crankpin 10 passes counterclockwise through bottom dead center, strip 18 will be properly returned to its group. Lips 35 will then be withdrawn from windows 37 by clockwise rotation of arm 24 which disengages strip 18 as rod 15 sweeps across recess 22. Registration between holes 36 and windows 37 may be readily adjusted by placing rod 15 in its bottom dead center position and adjusting crankpin 10 within its slot 12.

Thus, it can be seen that the invention functions to provide the four motions described above while employing only a single reversal of driving means 45.

While there have been shown and described and pointed out the fundamental novel features of the invention as applied to the preferred embodiment it will be understood that various omissions and substitutions and changes in the form and details of the device illustrated and in its operation may be made by those skilled in the art without departing from the spirit of the invention. For example, if processing of strips 18 were to be done in a vertical manner, guideway 16 could be a vertical slot and under those circumstances rod 15 would need not be less than the diameter of the circle described by rotation of crankpin 10 about the axis of drum 11. Therefore, it is the intention to be limited only as indicated by the scope of the following claims.

What is claimed is:

1. In a data processing machine utilizing a number of groups of closely stored data-bearing elements and a reciprocally driven pickup head for providing access thereto, a drive mechanism for partially inserting said head into a selected group, withdrawing said head therefrom, replacing said head to its inserted position, and returning said head to a position clear of all said stored elements to permit said head to be moved to a new group, said drive mechanism comprising a crankpin mounted for rotation in two directions about an axis spaced therefrom, a guideway for channeling the movements of said pickup head, one end of said guideway terminating at a location closely adjacent said elements, said crankpin having a bottom dead center position corresponding to the maximum displacement of said pickup head along said guideway in the direction of said elements, said maximum displacement being sufficient to at least partially insert said pickup head into a selected group of said elements, a connecting linkage coupled to said crankpin and said pickup head to draw said pickup head along said guideway under rotation of said crankpin, drive means operatively coupled to said crankpin for rotating said crankpin in a first direction through said bottom dead center position to first insert said pickup head into a group of said elements to enable said head to engage one of said elements during said insertion and then under continuation of said first direction movement to subsequently at least partially withdraw said engaged element from its group for processing, means operatively coupled to said crankpin for reversing said crankpin movement to drive said crankpin back through said bottom dead center to reinsert said pickup head into said group to enable said head to replace said element, and means for arresting the rotation of said crankpin in said second direction sufficiently beyond said bottom dead center position to return said pickup head to a position clear of all said elements.

2. The invention as defined in claim 1 wherein said arresting means is adjustable to control the degree of clearance of said head from said elements.

3. The invention as defined in claim 1 further comprising means for varying said spacing between said axis and said crankpin to regulate the degree of said insertion of said head.

4. In a data processing machine utilizing a number of groups of closely stored data-bearing elements and a reciprocally driven pickup head for providing access thereto, a drive mechanism for partially inserting said head into a selected group from a position clear of said elements, withdrawing said head therefrom, replacing said head to its inserted position, and returning said head to said position clear of all said stored elements to permit said head to be moved to a new group, said drive mechanism comprising a drum mounted for rotation about an axis, a crankpin mounted for rotation in two directions about said axis and spaced therefrom, a guideway to channel the movements of said pickup head, said guideway leading from a location closely adjacent the ends of said elements to the periphery of said drum, said crankpin having a bottom dead center position corresponding to the maximum displacement of said pickup head along said guideway in the direction of said elements, said maximum displacement being sufficient to at least partially insert said pickup head into a selected group of said elements, a connecting rod coupled at one of its ends to said crankpin and at its other end to said pickup head to draw said head along said guideway under rotation of said crankpin, means operatively coupled to said crankpin for driving said crankpin continuously in a first direction through said bottom dead center position to insert said head into a group of said elements to enable said head to engage and withdraw one of said elements from its group, said driving being continued in said first direction sufficiently to withdraw said element entirely from said guideway and onto said drum for processing, means operatively coupled to said crankpin for driving said crankpin in a second direction opposite said first direction back through said bottom dead center position to reinsert said pickup head into its said group to enable said head to replace said element, and means for arresting the rotation of said crankpin in said second direction sufficiently beyond said bottom dead center position to return said pickup head to a position clear of all said elements.

5. A data storage access mechanism for handling a selected one of a number of closely packed thin, elongated, flexible, data-bearing tapes supported in a group, said access mechanism comprising a tape pickup head having means for engaging said selected tape, a drive mechanism for successively partially inserting said head into said group from a position clear of said tapes, for withdrawing said selected tape and said head together from said group, for restoring said head to its inserted position, and for returning said head to said position clear of said tapes to permit said head to be reoriented with respect thereto, said drive mechanism including a crankpin mounted for rotation in two directions about an axis spaced therefrom, a guideway to channel the movements of said pickup head to a location closely adjacent the ends of said tapes, said crankpin having a bottom dead center position corresponding to the maximum displacement of said pickup head along said guideway in the direction of said tapes, said maximum displacement being sufficient to at least partially insert said pickup head into a selected group of said tapes, a connecting rod coupled at one of its ends to said crankpin and at its other end to said pickup head to draw said head along said guideway under rotation of said crankpin, said connecting rod being sufficiently short to provide complete withdrawal of said pickup head from said guideway, said connecting rod being further operably coupled to said engaging means and constructed and arranged to effect engagement and disengagement of said selected tape substantially at said bottom dead center position, means operatively coupled to said crankpin for driving said crankpin through a complete revolution thereof in a first direction so that as said crankpin passes through said bottom dead center position said head will be inserted into said group where said engaging means acts to grasp the selected tape, said first direction motion being continued through said complete revolution to withdraw said selected tape from its group and into said annular path for processing, means operatively coupled to said crankpin for driving said crankpin in a second direction opposite said first direction back through said bottom dead center position to reinsert said pickup head into said guideway to replace and disengage said tape substantially at said bottom dead center position, and means for arresting the rotation of said crankpin in said second direction sufficiently after passing said bottom dead center position to retract said pickup head clear of all said tapes.

6. The invention as defined in claim 5 wherein said arresting means is adjustable to control the degree of clearance of said head from said elements.

7. The invention as defined in claim 6 further comprising means for varying the said spacing between said axis and said crankpin to adjust the degree of said insertion of said head into said group.

8. The invention according to claim 1 wherein said linkage is constructed and arranged to withdraw said engaged element entirely from its group upon continuation of said first direction crankpin movement.

References Cited in the file of this patent

UNITED STATES PATENTS

| | | |
|---|---|---|
| 630,864 | Crowell | Aug. 15, 1899 |
| 1,024,459 | Seymour | Apr. 23, 1912 |